United States Patent Office 3,266,753
Patented August 16, 1966

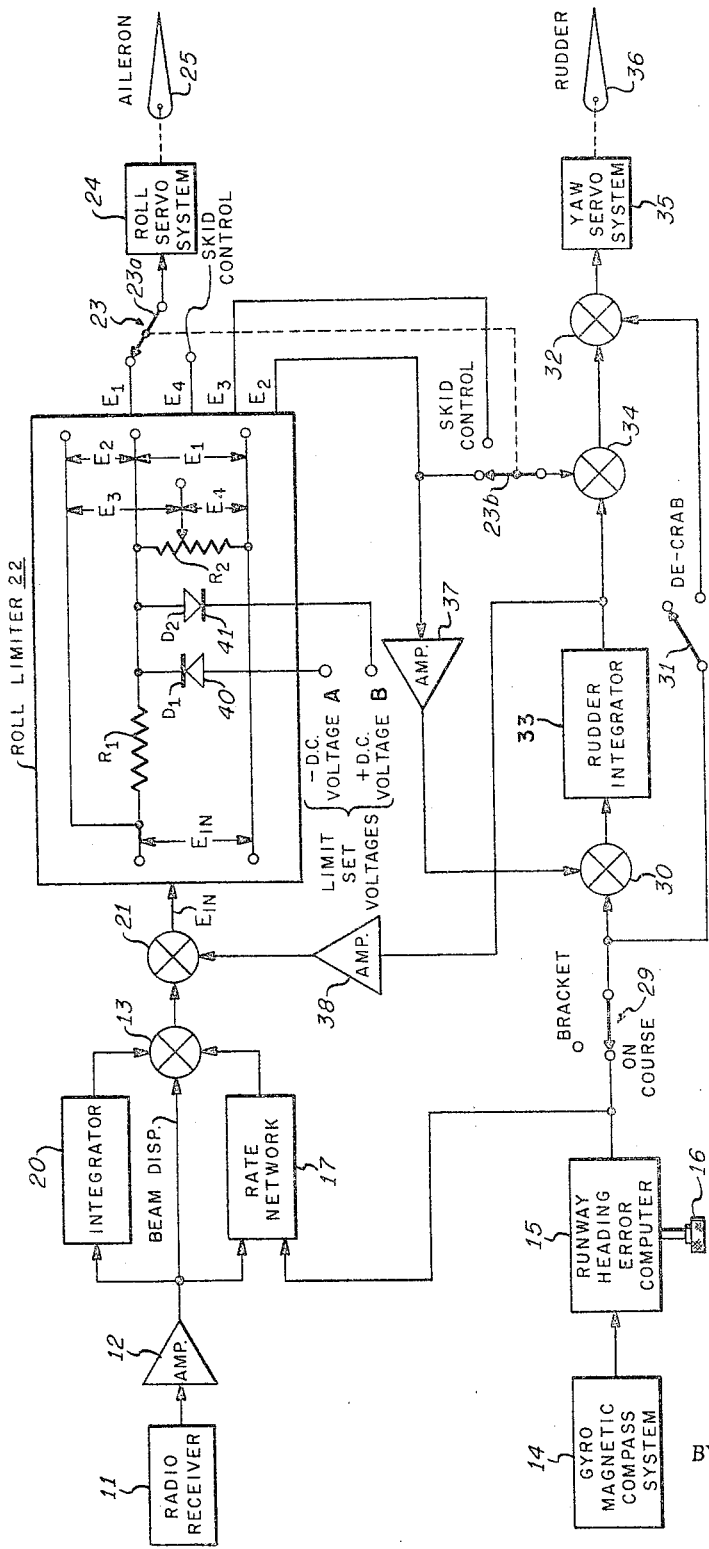
Aug. 16, 1966     R. GAYLOR     3,266,753
AUTOMATIC LANDING SYSTEM
Filed June 1, 1964
FIG. 1.
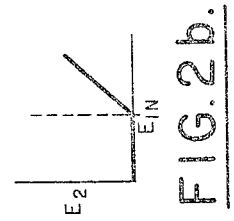
FIG. 2c.
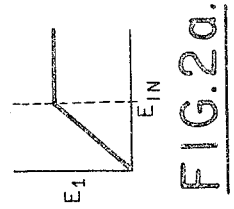
FIG. 2b.
FIG. 2a.
INVENTOR.
RANDALL GAYLOR
BY
ATTORNEY

3,266,753
AUTOMATIC LANDING SYSTEM
Randall Gaylor, Phoenix, Ariz., assignor to Sperry Rand Corporation, Great Neck, N.Y., a corporation of Delaware
Filed June 1, 1964, Ser. No. 371,433
9 Claims. (Cl. 244—77)

This invention relates to an aircraft flight control system for guiding aircraft along a radio defined course and more particularly for automatically guiding a radio controlled aircraft to a safe landing on a runway, especially when a cross wind prevails.

In aircraft instrument landing systems (ILS), localizer and glide slope radio beams are generated from ground based transmitting stations located adjacent to the runway. The intersection of the radio beams defines the desired course which the aircraft is to travel in approaching the runway. The localizer beam guides the aircraft with respect to an azimuthal course of flight while the glide slope beam serves the purpose of directing the aircraft on a vertical course of flight as it approaches the runway. Usually, an aircraft is guided simultaneously by signals from both localizer and glide path transmitters so that the desired course of approach is defined in the horizontal plane by azimuthal heading and in the vertical plane by rate or angle of descent. The present invention is primarily concerned with lateral control of an aircraft while it is being guided by signals from a localizer or similar beam to a landing.

Lateral control during landing can be divided into three phases, bracketing, on-course stabilization, and pre-touchdown control. The bracketing phase involves controlling the aircraft from the time it enters the localizer beam to the time the aircraft is stabilized on-course.

After the bracket is completed, the control system must keep the aircraft stabilized on the final approach path. The problems involved in doing this are centered around the fact that the localizer data is noisy and the approach path it defines in many cases bends. A further complication is the fact that the radio beam converges and thus the error signal gain varies inversely with range to the transmitter. In prior automatic approach operation, a small course error could be tolerated because the pilot could easily correct for it when he took command on visual reference at about 200 feet altitude. However, for a completely automatic landing in accordance with the instant invention the lateral accuracy at touchdown must be held within a few feet.

Lateral control during the period just prior to touchdown is further complicated by two factors: (1) as the altitude is reduced to touchdown it becomes undesirable to use roll control to correct for path errors, and (2) just prior to touchdown the aircraft heading must be aligned with the runway heading.

The control of the aircraft just prior to touchdown is the most critical part of the landing. If the on-course stabilization is poor, there is time to correct the situation as well as time to elect a go-around if necessary, however, just prior to touchdown, there is no room for error. Because of this, it is very important not to switch to a basically different control mode during this period. It is desirable to use the same circuits that are used during the approach phase because their proper operation will have been tested by the earlier and less critical phases of the automatic landing. However, the best mode of control for on-course stabilization (that is, maneuvering by means of roll control) is not completely suited for the pretouchdown phase of landing. As altitude decreases during landing, it becomes less and less desirable to allow the aircraft to take on large roll attitudes.

In the present invention a roll limiter is used to control the roll command signal. The same limiter is used during the entire landing from bracket to touchdown but the roll limit value is continuously adjusted for the requirements of the particular phase of the landing. As altitude decreases, the roll limit is decreased consistent with the allowable roll angle for the particular altitude and aircraft. To maintain control when the roll limit is exceeded, the difference between the limiter input and output is fed to the rudder channel of the automatic flight control system. In accordance with the present invention, whenever roll commands are within the limit dictated by the aircraft altitude, roll is used for control. If the commands exceed the allowable roll attitude, roll is used to its limit and rudder is added to provide the additional control required.

Another problem in the final phase of landing is usually presented by the decrab maneuver. In the present invention, crab angle will be gradually removed during the final approach by commanding the aircraft to slip with a wing down attitude by feeding the integral of the crab angle (i.e., runway heading error) to the rudder channel and will require the aircraft to take a steady state roll angle to hold course. The same roll limiter is used to limit the total roll command during the maneuver. When the cross wind is too great for the allowable roll angle, the difference between the input and output of the limiter is fed to the integrator to limit the skid signal fed to the rudder. Only the crab angle not removed by this skid is removed by a final decrab maneuver. In operation the present invention provides a skid to eliminate the crab angle well in advance of touchdown in all but severe cross wind conditions. In severe cross wind conditions it removes as much of the crab angle as possible without exceeding roll limits and removes the remaining crab angle with a decrab maneuver just prior to touchdown.

The arrangement of maintaining the aircraft heading aligned with the runway heading by slipping the craft with a wing down attitude is particularly advantageous when utilized in combination with a windshield display system since it reduces the angular field of vision requirement of the windshield display system. A typical windshield display system is disclosed in U.S. patent application S.N. 240,836 entitled "Runway Defining Apparatus" of I. S. Westerback, filed November 29, 1962.

The present invention is an improvement over the system described in U.S. Patent No. 3,120,934 entitled "Aircraft Automatic Landing System," invented by A. J. Robertson, issued February 11, 1964.

It is a primary object of the present invention to provide an automatic landing system for landing radio controlled aircraft in the presence of a cross wind.

It is an additional object of the present invention to provide an automatic system for safely landing aircraft which eliminates the need for an abrupt command just prior to touchdown.

It is a further object of the present invention to provide an aircraft automatic landing system which does not require the use of untried circuits close to the ground.

It is another object of the present invention to provide an aircraft automatic landing system in which the heading of the aircraft is substantially aligned with the runway during the approach in order to reduce the angular field of vision requirement when utilizing a windshield display system.

It will become apparent that the foregoing objects have been achieved by the present invention upon a study of the following disclosure when considered in connection with the accompanying drawings in which:

FIG. 1 is a schematic block diagram of an aircraft flight control system incorporating the present invention; and FIGS. 2a, 2b, and 2c are graphs showing the output signal from the roll limiter as compared with its input signal.

Referring to FIG. 1, an automatic landing system 10 is shown in an approach mode with the aircraft on the desired radio-defined course while making an approach to a predetermined runway. The system 10 includes a radio navigation receiver 11 mounted on the aircraft which provides D.C. signals based upon the signals received from a ground based radio transmitter such as the localizer transmitter of an instrument landing system (ILS). The D.C. signal from the radio receiver 11 has a magnitude and polarity representative of the lateral displacement and direction respectively of the aircraft with respect to the center of the localizer beam which defines the desired radio course. An amplifier 12 amplifies the beam displacement signal from the radio receiver 11 and provides an amplified beam displacement signal to an input terminal of an algebraic summation device 13. In order to provide lateral control of the aircraft with respect to the localizer beam of sufficient accuracy for automatic landing, high localizer gains are required and the effects of wind shear (changing cross wind) and undesirable beam noise must be minimized. From a beam noise standpoint, it is desirable to use a heading error term for a damping signal. The use of pure heading error, however, requires a localizer integrator to remove standoff resulting from the crab heading in the presence of cross wind. In the presence of wind shear, a beam standoff will result even with a localizer integrator. The use of rate derived from localizer beam displacement eliminates the wind shear problem but must be greatly filtered to eliminate excessive roll activity on noisy beams. To provide a system for automatic landing, the present invention uses a combination of derived beam rate and heading error which exploits the advantage of each signal while minimizing the disadvantages.

A conventional gyromagnetic compass system 14 is connected to a runway heading error computer 15 to provide a runway heading error signal. The compass system 14 provides a signal representative of the aircraft heading while the heading of the runway upon which the aircraft is to land is introduced into the computer 15 manually by means of a runway heading select knob 16 in order that the output from the computer 15 is representative of the difference between the actual aircraft heading and the heading of the runway, i.e., the runway heading error. To provide the advantages explained in the preceding paragraph, both the computer 15 and the amplifier 12 are connected to a rate network 17 which may be of the R.C. differentiating type with a time constant of, for example, four seconds. The resulting output signal from the rate network 17 consists of a beam rate term lagged by the four second time constant and a heading error signal washed out by the four second time constant. Beam rate is therefore used to provide damping at low frequencies while heading error is used for high frequency damping. Beam noise problems are minimized by the heavy filtering on the derived rate and the long period heading information (which causes the wind shear problem) is washed out relatively fast. With the above described lateral damping arrangement, a high beam displacement gain can be provided in the amplifier 12.

The rate network 17 is connected to another input terminal of the algebraic summation device 13. The amplifier 12 is also connected to a localizer integrator 20 which has its output connected to another input terminal of the algebraic summation device 13. The integrated beam displacement signal from the integrator 20 eliminates beam standoff due to aircraft trim changes and any system unbalance. The output terminal of the algebraic summation device 13 is connected to an input terminal of another algebraic summation device 21 which in turn has its output terminal connected to a roll limiter 22. The roll limiter 22 will be described in detail subsequently. The roll limiter 22 is connected through the contact arms 23a of a skid control switch 23 to the roll servo system 23 for controlling the ailerons 25. The roll channel of the aircraft flight control system has been greatly simplified for purposes of simplicity of explanation and may be of the type disclosed in U.S. Patent 3,007,656, entitled "Aircraft Automatic Pilots" of H. Miller et al., issued November 7, 1961, which includes many details not disclosed herein such as short and long term roll stabilization means.

The runway heading error computer 15 is also connected through a cross wind control switch 29 to an input terminal of an algebraic summation device 30 and through a decrab switch 31 to an input terminal of another algebraic summation device 32. The output terminal of the algebraic summation device 30 is connected to a rudder integrator 33 which has its output connected to an input terminal of the algebraic summation device 21 and to an input terminal of an algebraic summation device 34. The rudder integrator 33 may be of the electronic type having a time constant of greater than 20 seconds. The output of the algebraic summation device 34 is connected to another input terminal of the algebraic summation device 32 which in turn has its output terminal connected to a yaw servo system 35 that is connected to control a rudder 36. The yaw channel of the automatic flight control system has also been greatly simplified and may be of the type disclosed in said U.S. Patent 3,007,656 which includes short and long term yaw stabilization means not shown herein.

The roll limiter 22 has four output terminals which provide composite output signals representative of voltages $E_1$, $E_2$, $E_3$, and $E_4$, respectively. The voltages $E_1$ and $E_4$ are selectively connected through the contact arm 23a of skid control switch 23 to the roll servo system 24 while the $E_2$ and $E_3$ terminals are selectively connected through the contact arm 23b of the skid control switch 23 to an input terminal of the algebraic summation device 34. The contact arms 23a and 23b are ganged together. The $E_2$ terminal is also connected through an amplifier 37 to an input terminal of the algebraic summation device 30.

The function of the roll limiter 22 is to limit the amplitude of the input signal to the roll servo system 24 and thus to limit the magnitude of the bank angle to prevent the craft from rolling to a dangerous bank angle by varying the potential applied to the limiting diodes 40 and 41. The bank angle limit determined by the roll limiter 22 may be varied as desired, for example, in accordance with altitude or skid turn control, in a manner to be more fully described.

In the following description of the operation of the present invention it is assumed that the aircraft is making a radio controlled approach with respect to a predetermined runway with a cross wind prevailing. The skid control switch 23 has its contact arms 23a and 23b in the condition shown in the drawing while the cross wind control switch 29 is in its upper position contacting the blank contact labeled "BRACKET" thereby disconnecting the runway heading error computer 15 from the algebraic summation device 30. As the aircraft initially turns to the localizer beam, the radio navigation receiver 11 provides a signal representative of the lateral departure of the aircraft from the radio defined course. This beam displacement signal is amplified in the amplifier 12 and compared with the output from the rate network 17 in the algebraic summation device 13. As the aircraft continues to approach the localizer beam, a position is reached when the aircraft is approximately stabilized on the beam and the beam displacement and rate signals are below predetermined minimum values which define on-course flight. Some time prior to the approach, the human pilot has manually adjusted the runway heading select knob 16 to insert the heading of the selected runway into the computer 15. The runway heading error signal from computer 15 is introduced into the rate network 17 to provide a beam rate output signal therefrom in the manner described above.

The integrator 20 integrates the beam displacement signal to eliminate beam standoff which due to the runway heading error signal can be caused by crosswinds. Thus, as the aircraft is flying down the glide slope, the beam displacement, rate and integral signals in addition to runway heading error provide an output from the algebraic summation device 13 which is connected through the roll limiter 22 to the roll servo system 24 to control the ailerons 25.

When the aircraft is on-course in the presence of cross winds, the cross wind control switch 29 is placed in the on-course position either automatically or manually thereby connecting the runway heading error computer 15 to the algebraic summation device 30 which in turn connects the runway heading error signal to the rudder integrator 33. The integrated runway heading error signal from the integrator 33 is connected to the yaw servo system 35 which controls the rudder 36 to cause the aircraft to turn towards the runway heading. As this occurs the aircraft will tend to drift across the localizer beam due to the prevailing cross wind and thus develop a beam displacement signal from the radio receiver 11. This will result in a localizer error signal from the algebraic summation device 13 which is transmitted through the roll limiter 22 to the roll servo system 24 to command a steady roll angle to hold the aircraft on the beam. Thus, the aircraft heading will be aligned with the runway heading and a lateral slip is maintained to hold the aircraft on the desired localizer course. This method of control is used to touchdown and obviates the requirement for a decrab maneuver at a dangerously low altitude immediately prior to touchdown.

The above explanation assumes that the roll attitude of the aircraft resulting from the prevailing cross wind will not exceed the maximum allowable roll attitude for the particular aircraft. For example, in order to compensate for a 30 knot cross wind in one aircraft requires approximately 6.5° of roll. This indicates that for severe cross wind conditions a limit on the maximum roll angle may be required, for example, not in excess of 5°. Then, when the input signal to the roll limiter 22 is less than the maximum roll limit, i.e., 5° during on-course conditions, the limiter 22 passes the signal to the roll servo system 24 to command the desired roll angle. However, when the input signal to the roll limiter 22 is greater than the 5° limit, the limiter 22 will limit the input signal in excess of that demanding a 5° roll angle and a signal proportional to the portion of the roll command in excess of the limited roll command will appear across the resistor $R_1$ as a voltage $E_2$. The voltage $E_2$ is connected through the contact arm 23b, the algebraic summation devices 34 and 32 ino the yaw servo system 35 to control the rudder 36. In this way, the localizer displacement, rate and integral of displacement along with the heading error signal are fed to the roll channel until the roll limit is reached and signals in excess of the roll limit are fed to the rudder channel. If the roll command exceeds the roll limit for a sustained period, the cross wind is too severe to be fully corrected for by the previously explained wing down technique. For this reason, the voltage $E_2$ is amplified in the amplifier 37 and also fed to the rudder integrator 33 via the algebraic summation device 30 to buck the heading error signal and stop the rudder integrator 33 when the roll limit is exceeded.

The roll limiter circuit 22 consists of a fixed resistor $R_1$, two diodes 40 and 41, and a resistor divider $R_2$. The two diodes 40 and 41 are biased by the limit set voltages A and B respectively which are equal in magnitude but opposite in polarity. For low input voltages (less than A and B) the circuit is a simple divider. $R_1$ is chosen low with respect to $R_2$ so that the gain $$\frac{(E_1)}{E_{in}}$$

will be close to 1.0. A ratio between $R_2$ and $R_1$ of approximately 10:1 will accomplish this. As the input voltage is increased the point is reached where $E_1$ equals the value of the diode bias voltage. Any increase in voltage above this value results in conduction through the diode which is biased with the same polarity as $E_1$. Since the forward resistance of the diode (conducting) will be very low compared to $R_1$, the voltage $E_1$ will not significantly exceed the diode bias value as the input voltage is increased. The characteristic is illustrated in FIG. 2a. As stated above $R_1$ is small as compared to $R_2$. Because of this, at low input voltage (diode not conducting) the voltage across $R_1$ is small. As the voltage is increased past the point at which the diode starts to conduct, the voltage $E_1$ is held at the limit value and the difference between $E_{in}$ and $E_1$ appears across $R_1$. Hence the voltage across $R_1$ ($E_2$) is approximately 0 up to the point where the diode conducts and increases linearly with increase in $E_{in}$ after this point. This characteristic is illustrated by the curve in FIG. 2b.

By adding a portion of the voltage across $R_2$ to $E_2$, $E_3$ is obtained (as shown in 22). FIG. 2c shows the output $E_3$ as a function of $E_{in}$. $E_4$ is equal to the divider ratio of $R_2$ times $E_1$. The curves 2a, 2b, and 2c show sharp breaks at the limit value. This is the case for an ideal diode only. In practice some rounding of the curves will result from the fact that actual diodes do not exhibit a discrete change in resistance at the point they start conducting.

The value of voltage at which the diodes will start conducting is equal to the value of the D.C. bias voltages A and B. When the voltage $E_1$ across $R_2$ is negative and exceeds A, $D_1$ conducts; when $E_1$ is positive and exceeds B, $D_2$ will conduct. The values of A and B will be the same so the circuit will obviously work equally well for A.C. or D.C. input voltage ($E_{in}$). Many known techniques are available for generating D.C. voltages as a function of other signals. Mode switch points and/or altitude may be used to set A and B, the roll limit voltage, for example.

For a typical application $R_1$ could be 1,000 ohms and $R_2=10,000$ ohms with the divider on $E_2$ adjustable.

A signal from the output of the rudder integrator 33 will always result in a tendency to drift across the beam. With the system described above, the localizer integrator 20 is required to generate an opposing signal to bring the aircraft back to the beam. To avoid this localizer standoff, the cross wind command from the output of the rudder integrator 33 is connected via a gain adjusting amplifier 38 and the algebraic summation device 21 to the roll limiter 22. Proper adjustment of the gain of the amplifier 38 eliminates this standoff problem. The gain of amplifier 38 is set to a value dependent on the ratio of rudder angle to roll angle for zero turn rate for the particular aircraft.

Any crab angle which has not been removed by the wing down technique described above will appear as a runway heading error from the computer 15 and if desired can be eliminated by placing the decrab switch 31 in its lowermost position which connects the runway heading error signal from the computer 15 to the yaw servo system 35 via algebraic summation device 32 thereby initiating a low altitude decrab maneuver which does not induce undesirable effects with respect to the aircraft or its passengers.

It may also be desirable for certain types of aircraft to provide a skid turn type of control during the final phase of the landing. This may be accomplished by connecting a voltage $E_3$ from the roll limiter 22 to the rudder channel in lieu of the voltage $E_2$ by placing the contact arm 23b in its lowermost position and by connecting a voltage $E_4$ in the roll channel in lieu of the voltage $E_1$ by placing the contact arm 23a of the skid control switch 23 in its lowermost position. Simultaneously, the limit bias on the roll limiter 22 must be adjusted to correct for the voltage divider on the roll command if the same bank limit is to be maintained. A skid turn is a turn in which rudder is used in excess of the amount required for coordination thus forcing the craft to turn at a rate in excess of that which would result from a coordinated turn at the particular bank angle.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An automatic landing system for guiding an aircraft to a landing along a radio defined course comprising,
   (a) radio receiving means for providing a first control signal in response to the lateral displacement of the aircraft from said course,
   (b) means for providing a second control signal representative of the lateral rate of displacement of the aircraft from said course,
   (c) means for providing a third control signal representative of the heading of the aircraft with respect to the heading of a predetermined runway,
   (d) first integrating means responsive to said first control signal for providing a fourth control signal representative of the integral of said first control signal,
   (e) second integrating means responsive to said third control signal for providing a fifth control signal representative of the integral of said third control signal,
   (f) roll servo means responsive to all of said control signals for controlling the sideslip of said aircraft to compensate for prevailing cross wind conditions, and
   (g) yaw servo means responsive to said fifth control signal for controlling said aircraft yaw, in accordance therewith whereby said aircraft heading tends to be maintained in alignment with said runway heading.

2. An automatic landing system for guiding an aircraft to a landing along a radio defined course comprising,
   (a) radio receiving means for providing a first control signal in respone to the lateral displacement of the aircraft from said course,
   (b) means for providing a second control signal representative of the lateral rate of displacement of the aircraft from said course,
   (c) means for providing a third control signal representative of the heading of the aircraft with respect to the heading of a predetermined runway,
   (d) first integrating means responsive to said first control signal for providing a fourth signal representative of the integral of said first control signal,
   (e) second integrating means responsive to said third control signal for providing a fifth control signal representative of the integral of said third control signal,
   (f) roll servo means responsive to all of said control signals for controlling the sideslip of said aircraft to compensate for prevailing cross wind conditions,
   (g) yaw servo means responsive to said second integrating means, and
   (h) means including control signal limiting means responsive to all of said control signals and in controlling relation to said roll servo means and said second integrating means for providing a composite output signal representative of the algebraic summation of all of said control signals less than a predetermined magnitude to said roll servo means and in excess of said predetermined magnitude to said second integrating means.

3. An aircraft automatic landing system for guiding an aircraft to a landing along a radio defined course, comprising,
   (a) radio receiving means for providing a first control signal in response to the lateral displacement of the aircraft from said course,
   (b) means for providing a second control signal representative of the lateral rate of displacement of the aircraft from said course,
   (c) means for providing a third control signal representative of the heading of the aircraft with respect to the heading of a predetermined runway,
   (d) first integrating means responsive to said first control signal for providing a fourth signal representative of the integral of said first control signal,
   (e) second integrating means responsive to said third control signal for providing a fifth control signal representative of the integral of said third control signal,
   (f) roll servo means responsive to said first, second, third, fourth and fifth control signals for controlling the aircraft in roll in accordance therewith, and
   (g) yaw servo means responsive to said fifth control signal for controlling the aircraft in yaw in accordance therewith.

4. An aircraft automatic landing system for guiding an aircraft to a landing along a radio defined course comprising,
   (a) radio receiving means for providing a first control signal in response to the lateral displacement of the aircraft from said course,
   (b) means for providing a second control signal representative of the lateral rate of displacement of the aircraft from said course,
   (c) means for providing a third control signal representative of the heading of the aircraft with respect to the heading of a predetermined runway,
   (d) first integrating means responsive to said first control signal for providing a fourth signal representative of the integral of said first control signal,
   (e) second integrating means responsive to said third control signal for providing a fifth control signal representative of the integral of said third control signal,
   (f) roll limiting means responsive to said first, second, third, fourth, and fifth signals for providing a composite roll command signal in accordance therewith when the algebraic summation of said first through fifth signals inclusive is less than a predetermined magnitude,
   (g) roll servo means responsive to said composite roll command signal for controlling the aircraft in roll in accordance therewith, and
   (h) yaw servo means responsive to said fifth control signal for controlling the aircraft in yaw in accordance therewith.

5. An aircraft automatic landing system for guiding an aircraft to a landing along a radio defined course comprising,
   (a) radio receiving means for providing a first control signal in response to the lateral displacement of the aircraft from said course,
   (b) means for providing a second control signal representative of the lateral rate of displacement of the aircraft from said course,
   (c) means for providing a third control signal representative of the heading of the aircraft with respect to the heading of a predetermined runway,
   (d) first integrating means responsive to said first control signal for providing a fourth signal representative of the integral of said first control signal,
   (e) second integrating means responsive to said third control signal for providing a fifth control signal representative of the integral of said third control signal, (f) roll limiting means responsive to said first, second, third, fourth, and fifth signals for providing a first composite output signal representative of the algebraic summation of said first through fifth signals less than a predetermined magnitude and a second composite output signal representative of the composite of said signals in excess of said predetermined magnitude, (g) roll servo means responsive to said first composite output signal for controlling the aircraft in roll in accordance therewith, and (h) yaw servo means responsive to said second composite output signal and said fifth control signal for controlling the aircraft in yaw in accordance therewith.

6. In a system of the character described in claim 5 further including comparison means disposed between said first integrating means and said roll limiting means for comparing an amplified fifth signal with the resultant of said first, second and fourth signals to tend to eliminate standoff of said aircraft from said radio defined course under severe cross wind conditions.

7. In a system of the character described in claim 6 in which said system further includes means for comparing said third control signal and second composite output signal in a manner tending to reduce said second composite output signal.

8. An aircraft automatic landing system for guiding aircraft to a landing on a runway along a radio defined course comprising, (a) means including radio receiving means for providing first and second control signals varying respectively in accordance with the lateral displacement and the lateral rate of displacement of the aircraft from said course, (b) means for providing a third signal representative of the heading of the aircraft with respect to the heading of said runway, (c) first integrating means responsive to said first control signal for providing a fourth control signal representative of the integral thereof, (d) second integrating means responsive to said third control signal for providing a fifth control signal representative of the integral thereof, (e) roll limiting means responsive to the algebraic summation of said control signals for providing a first composite control signal representative of said algebraic summation below a predetermined magnitude, a second composite control signal representative of said algebraic summation in excess of said predetermined magnitude, a third composite output signal representative of a function of said algebraic summation, and a fourth composite signal representative of another function of said algebraic summation, (f) roll servo means for controlling the aircraft in roll, (g) yaw servo means for controlling the aircraft in yaw, and (h) means including switch means for selectively connecting in a first condition said roll servo means to be responsive to said first composite signal and said yaw servo means to be responsive to said fifth control signal and said second composite signal and in a second condition for connecting said roll servo means to be responsive to said fourth composite signal and said yaw servo means to be responsive to said fifth control signal and said third composite signal whereby said first condition is for moderate cross wind conditions and said second condition is for severe cross wind conditions.

9. In a system of the character defined in claim 8 which said system further includes means for selectively rendering said yaw servo means directly responsive to said third control signal for rapidly yawing said aircraft to substantially the heading of said runway.

References Cited by the Examiner

UNITED STATES PATENTS 3,120,934  2/1964  Robertson _____ 244—77

FERGUS S. MIDDLETON, *Primary Examiner.*